(12) United States Patent
Wadkar

(10) Patent No.: US 11,213,769 B2
(45) Date of Patent: Jan. 4, 2022

(54) NOZZLES/SCREENS USED IN THE FLUID PROCESSING UNITS

(71) Applicant: Sudhir Wadkar, Pune Maharashtr (IN)

(72) Inventor: Sudhir Wadkar, Pune Maharashtr (IN)

(*) Notice: Subject to any disclaimer, the term of this patent is extended or adjusted under 35 U.S.C. 154(b) by 98 days.

(21) Appl. No.: 16/339,379

(22) PCT Filed: Oct. 17, 2017

(86) PCT No.: PCT/IN2017/050477
§ 371 (c)(1),
(2) Date: Apr. 4, 2019

(87) PCT Pub. No.: WO2018/073836
PCT Pub. Date: Apr. 26, 2018

(65) Prior Publication Data
US 2020/0038784 A1    Feb. 6, 2020

(30) Foreign Application Priority Data
Oct. 21, 2016   (IN) .............................. 201621013870

(51) Int. Cl.
*B01D 24/42*   (2006.01)
*B01D 24/14*   (2006.01)
*B05B 1/00*   (2006.01)
*B01D 29/33*   (2006.01)
*B01D 29/92*   (2006.01)
*B01D 39/10*   (2006.01)
*B05B 1/20*   (2006.01)

(52) U.S. Cl.
CPC .......... *B01D 24/425* (2013.01); *B01D 24/14* (2013.01); *B01D 29/33* (2013.01); *B01D 29/925* (2013.01); *B01D 39/10* (2013.01); *B05B 1/00* (2013.01); *B05B 1/202* (2013.01); *B01D 2201/44* (2013.01)

(58) Field of Classification Search
CPC ...... B01D 24/425; B01D 24/14; B01D 29/33; B01D 29/925; B01D 39/10; B01D 2201/44; B01D 29/52; B05B 1/14; B05B 1/202; B05B 1/00
See application file for complete search history.

(56) References Cited

U.S. PATENT DOCUMENTS

| | | | | |
|---|---|---|---|---|
| 3,750,885 A * | 8/1973 | Fournier | .............. | B01D 29/908 210/107 |
| 4,579,659 A * | 4/1986 | Eades | .................... | B01D 24/12 210/541 |
| 6,177,006 B1 * | 1/2001 | Nagaoka | ................ | B01D 29/15 210/195.1 |
| 8,876,017 B2 * | 11/2014 | Ekholm | ................ | B01D 24/12 239/119 |

* cited by examiner

*Primary Examiner* — Waqaas Ali
(74) *Attorney, Agent, or Firm* — Patshegen IP LLC; Moshe Pinchas

(57) ABSTRACT

The invention relates to an improvement in nozzles/screen for fluid flow distribution/collection used In fluid flow distribution/collection used In fluid processing units. Improvement in conventions nozzle/screen comprises a flow restricting cylindrical body to have ring washer shape aperture control at inlet/outlet. The improved nozzle/screen comprises outer casing made of stacked flat rings with micro opening between said stacked ring providing uniform throughout its periphery. A central conduit having holes for flow of fluid entering through the said outer casing. The said conduit having means to regulate fluid flow.

3 Claims, 10 Drawing Sheets

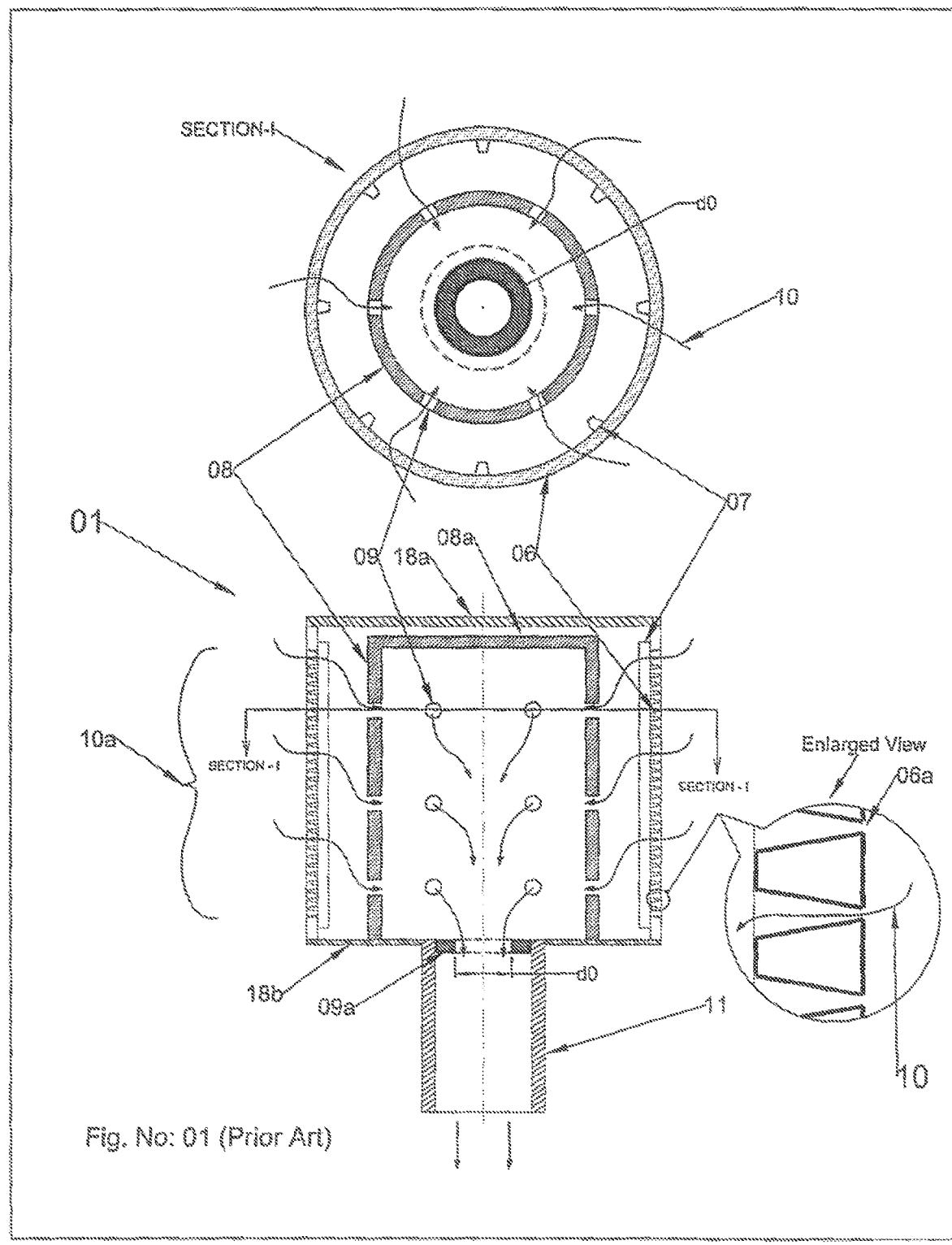
Fig. No: 01 (Prior Art)

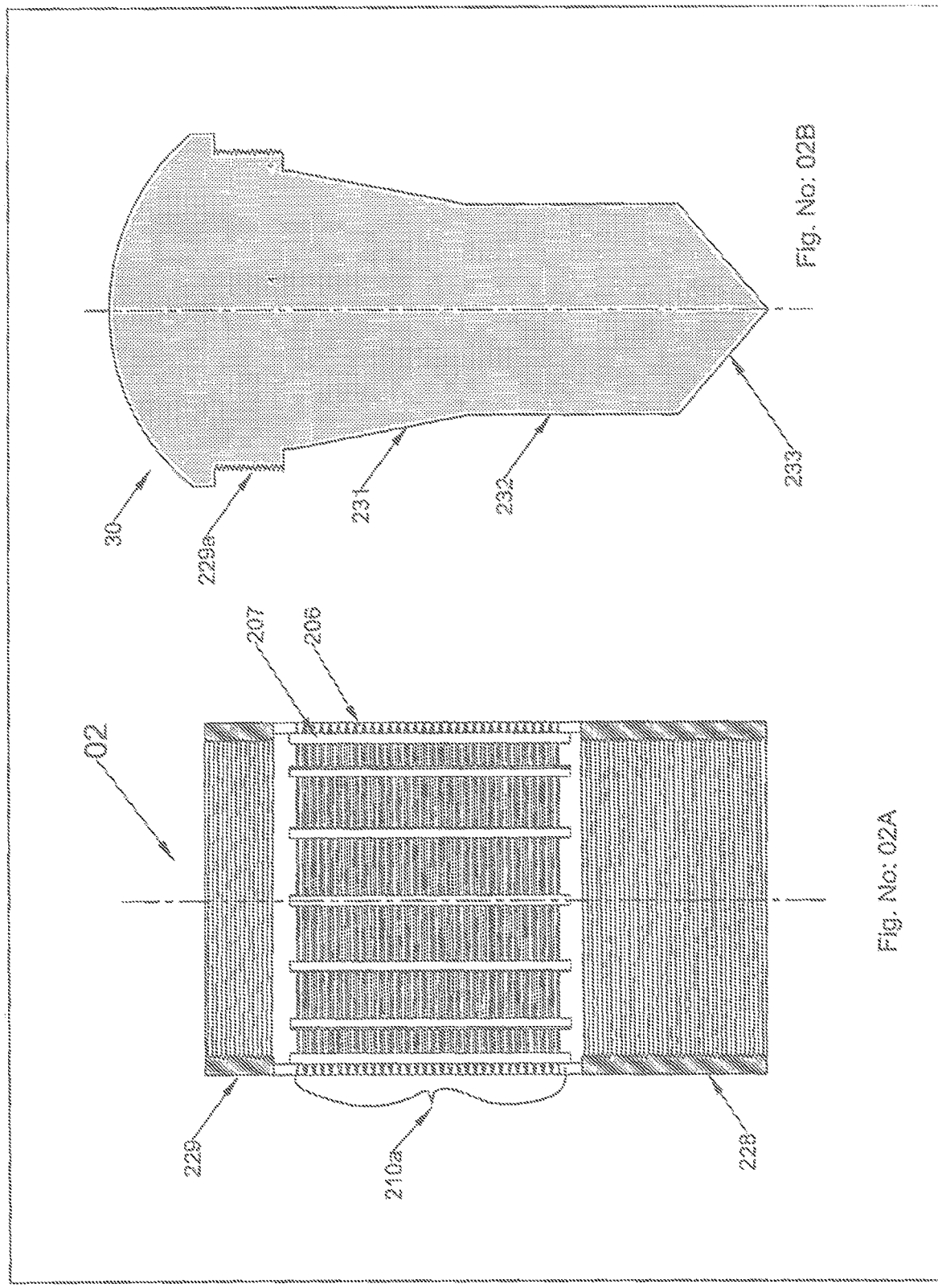

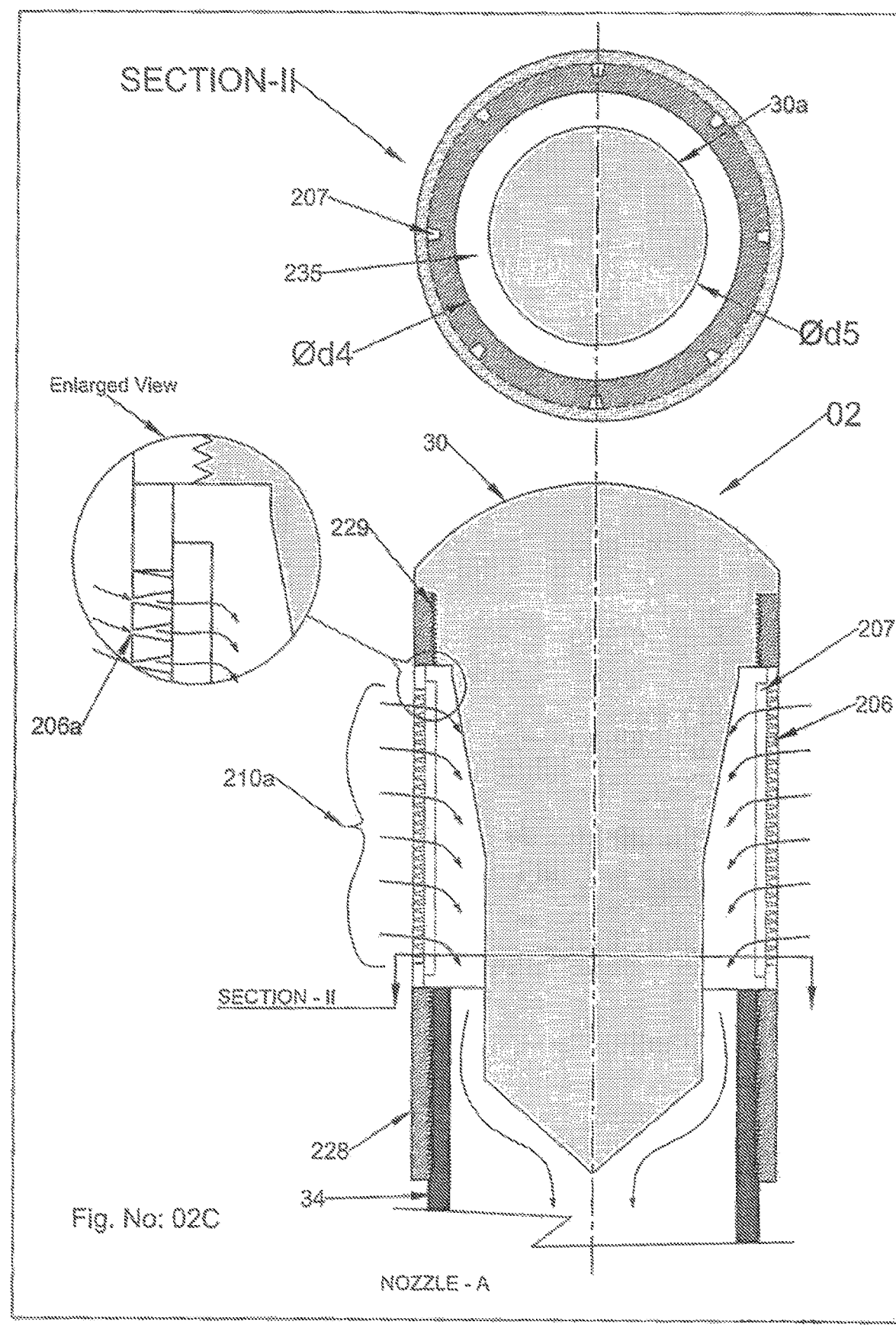

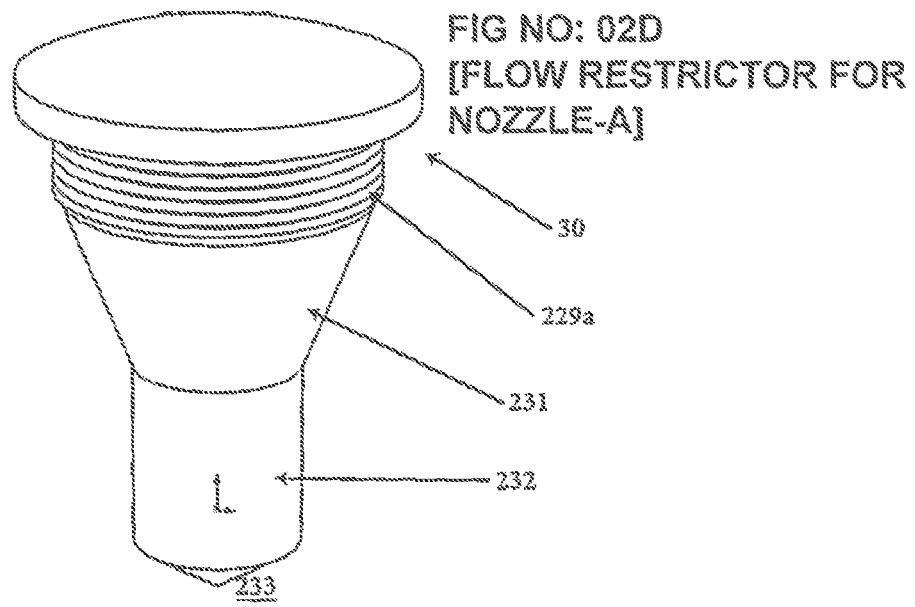
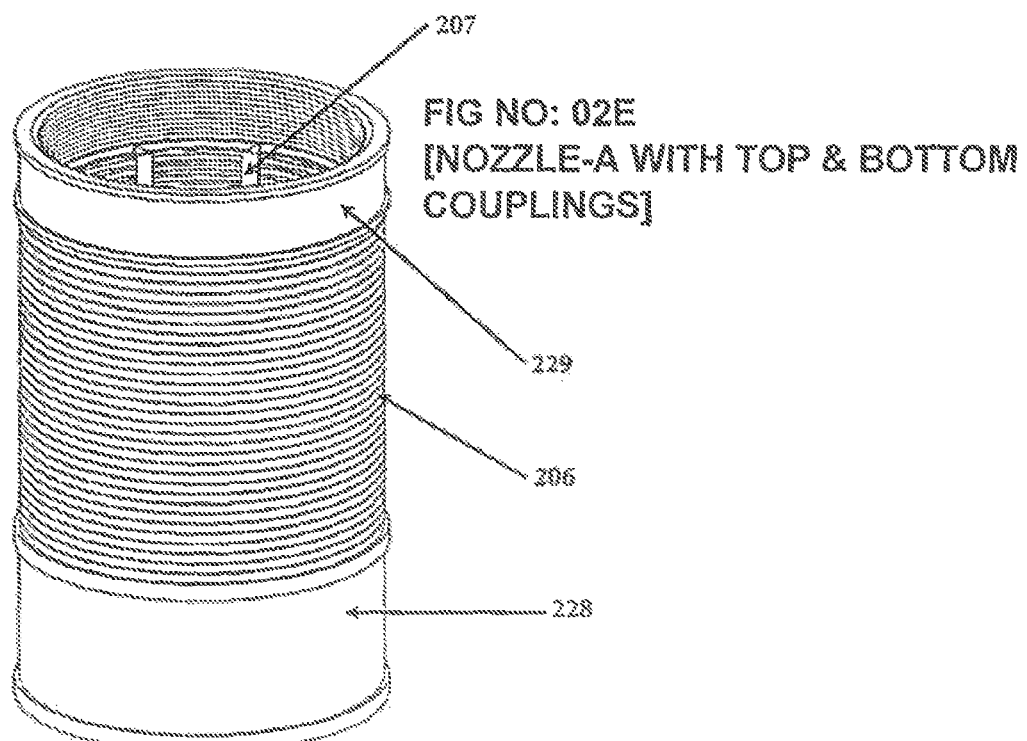

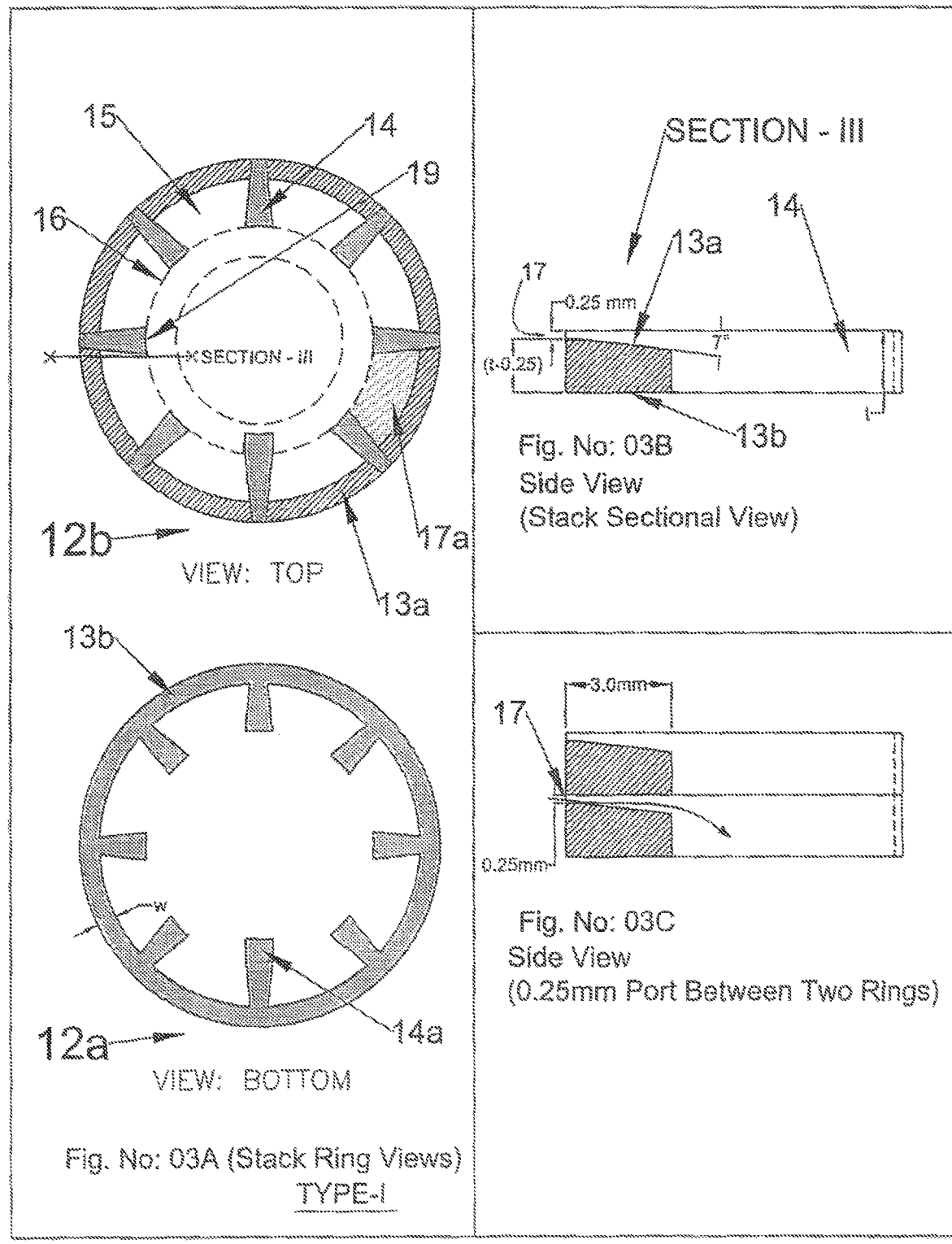

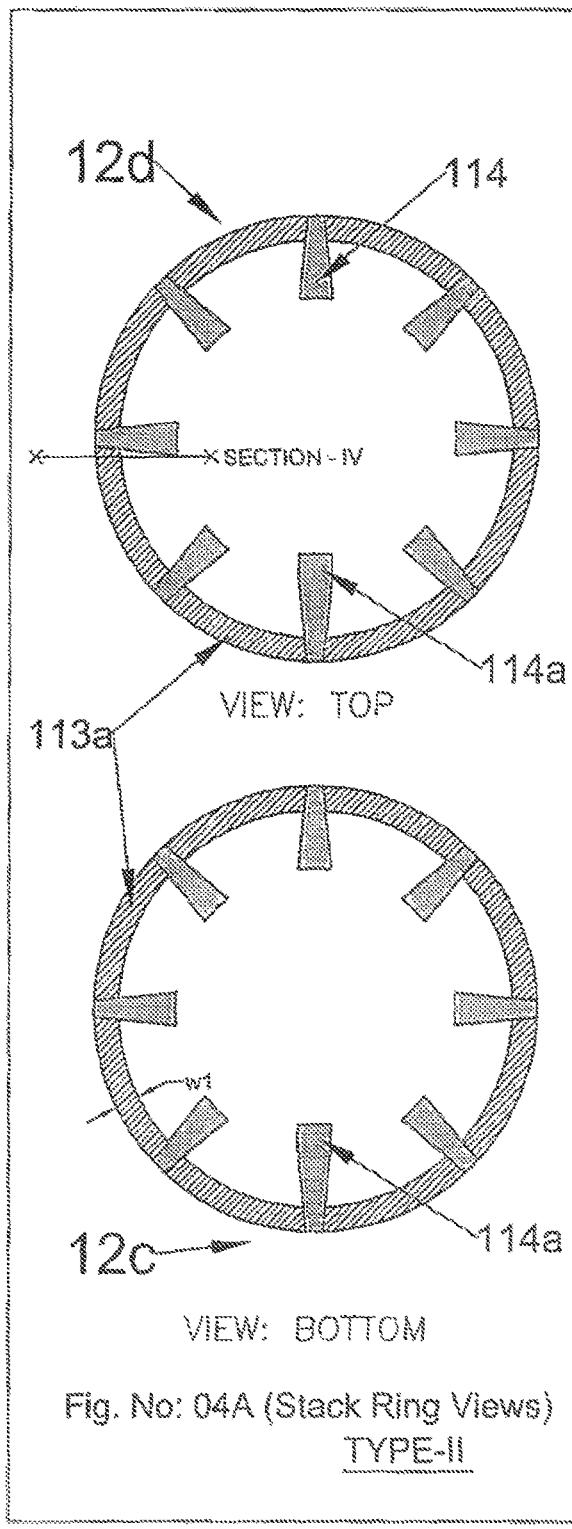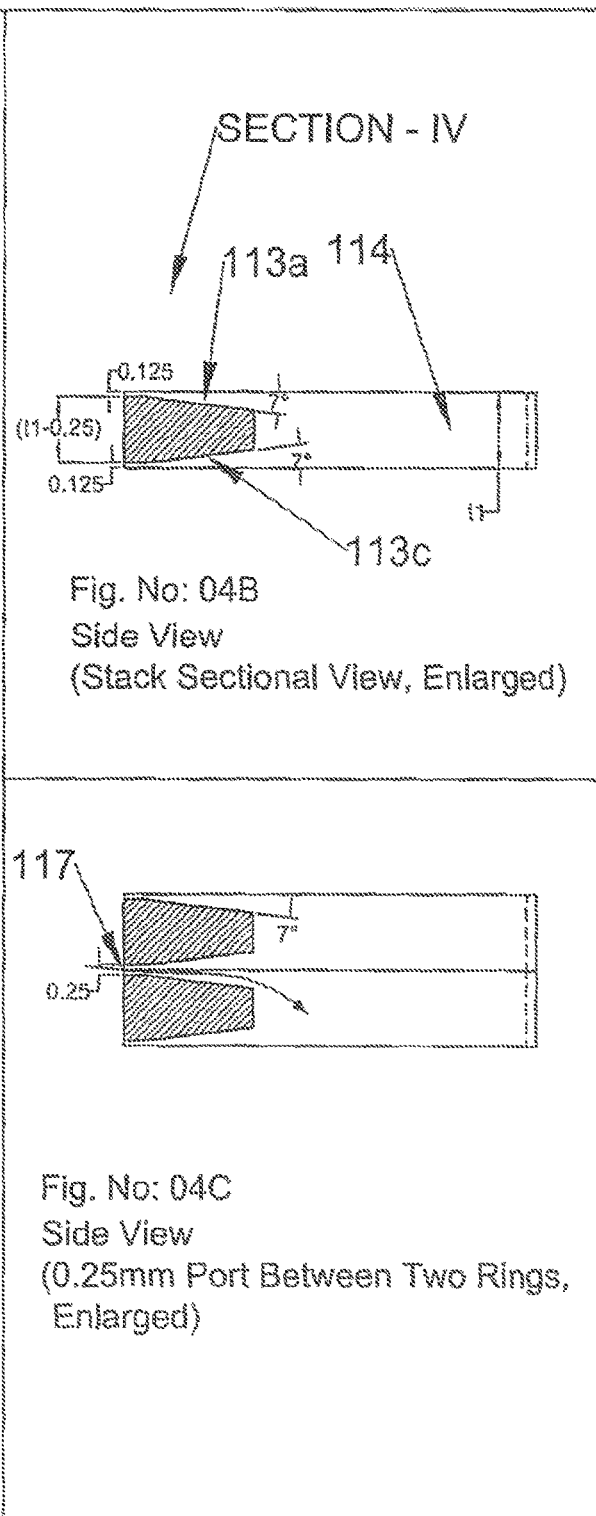

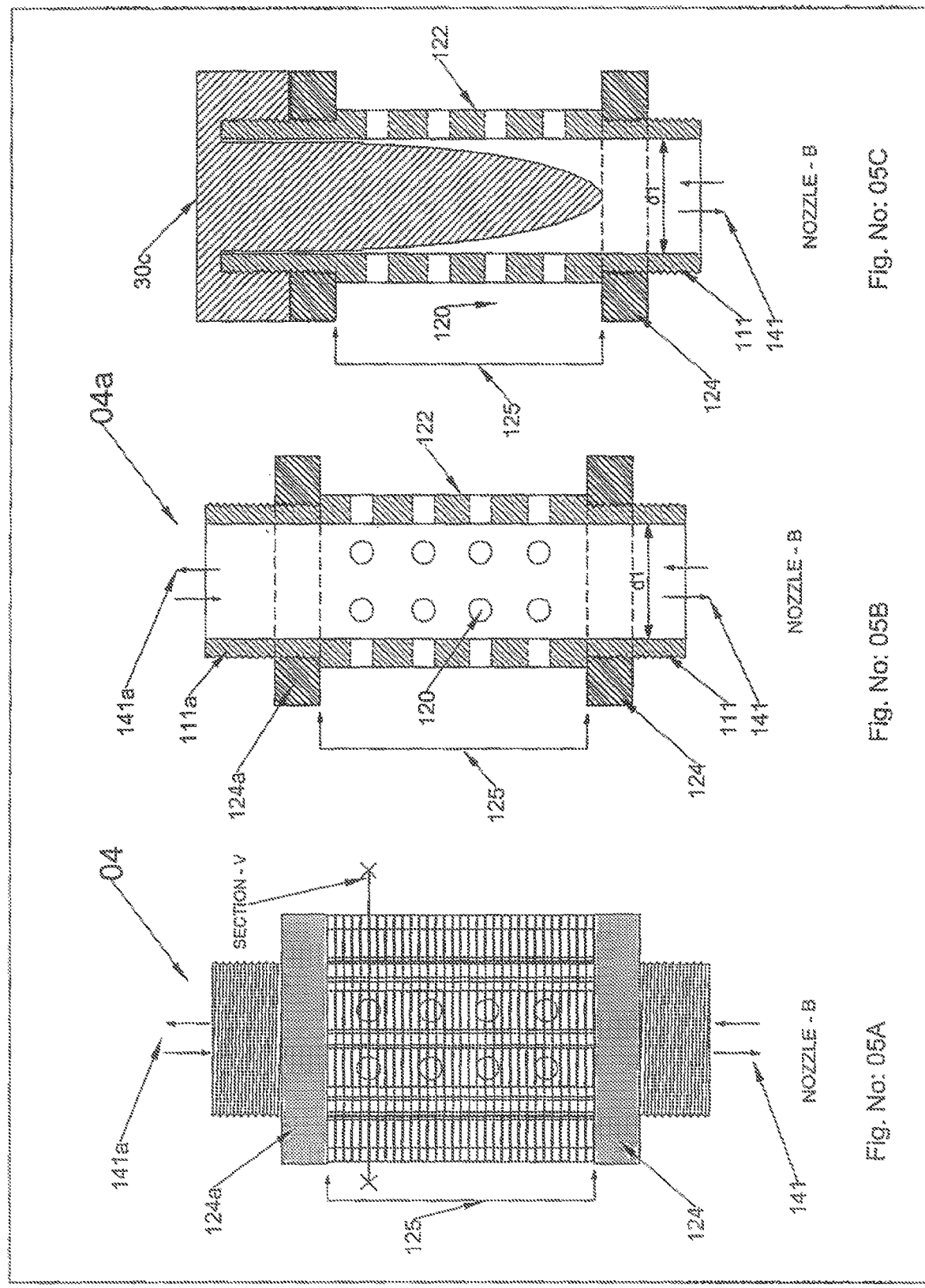
Fig. No: 05A    Fig. No: 05B    Fig. No: 05C

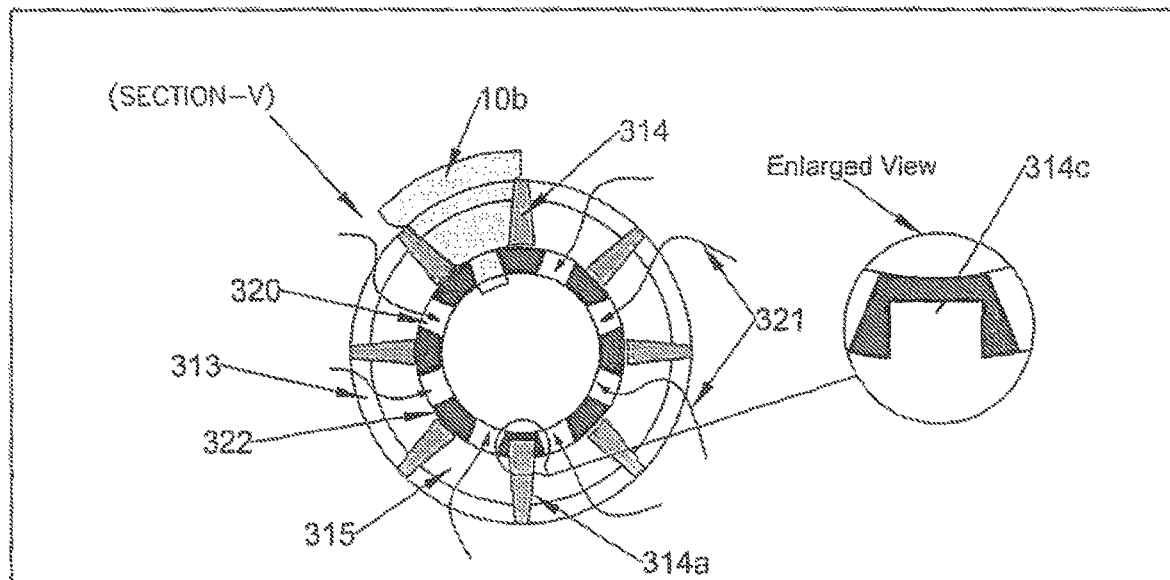
Fig. No: 06A
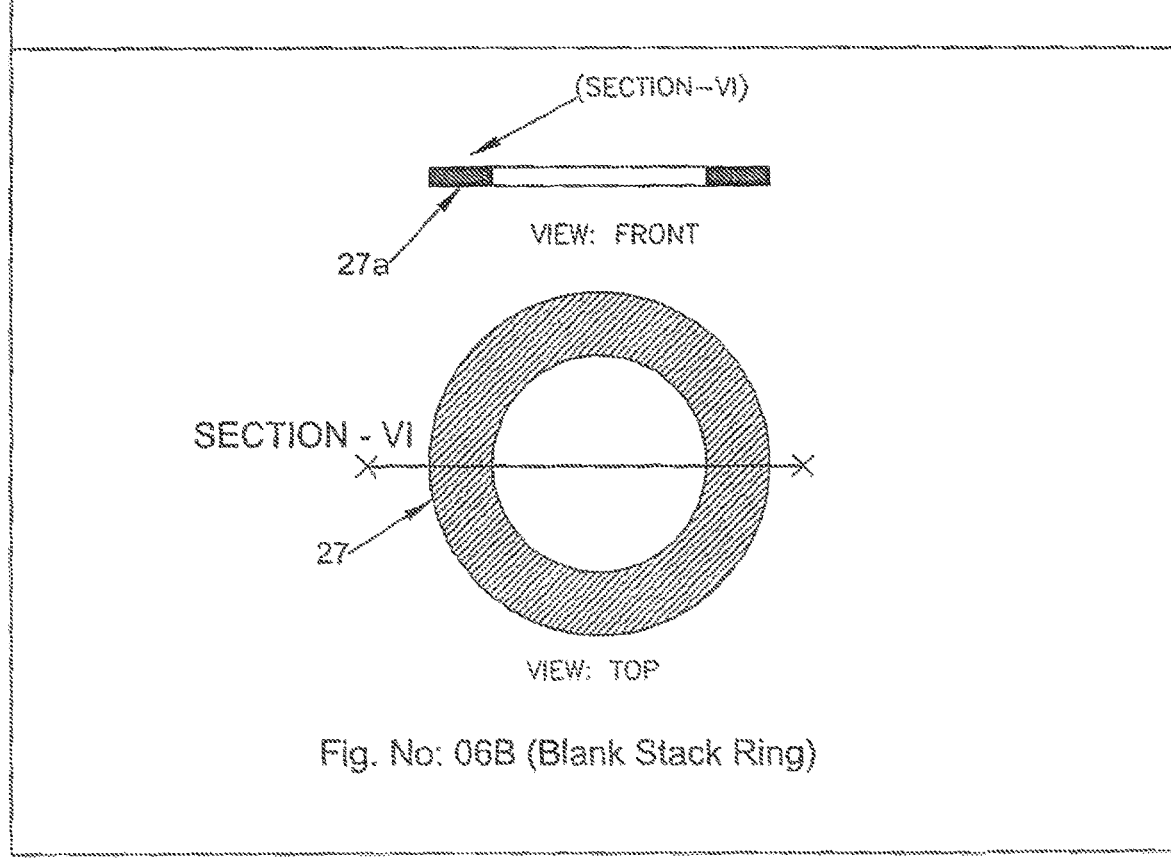
Fig. No: 06B (Blank Stack Ring)

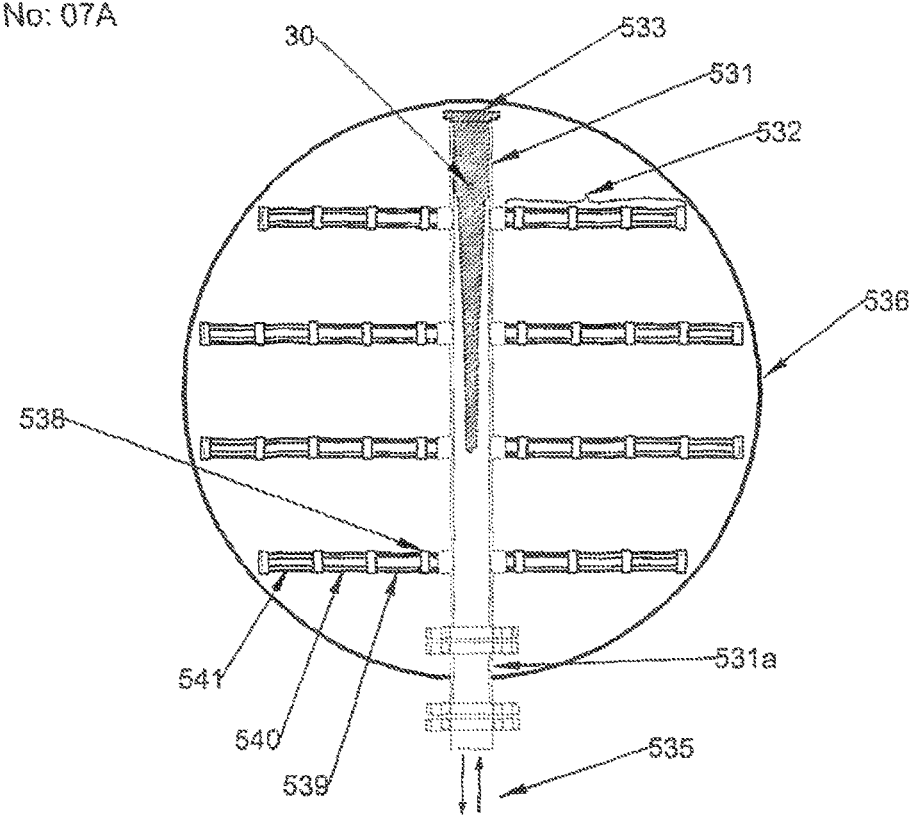

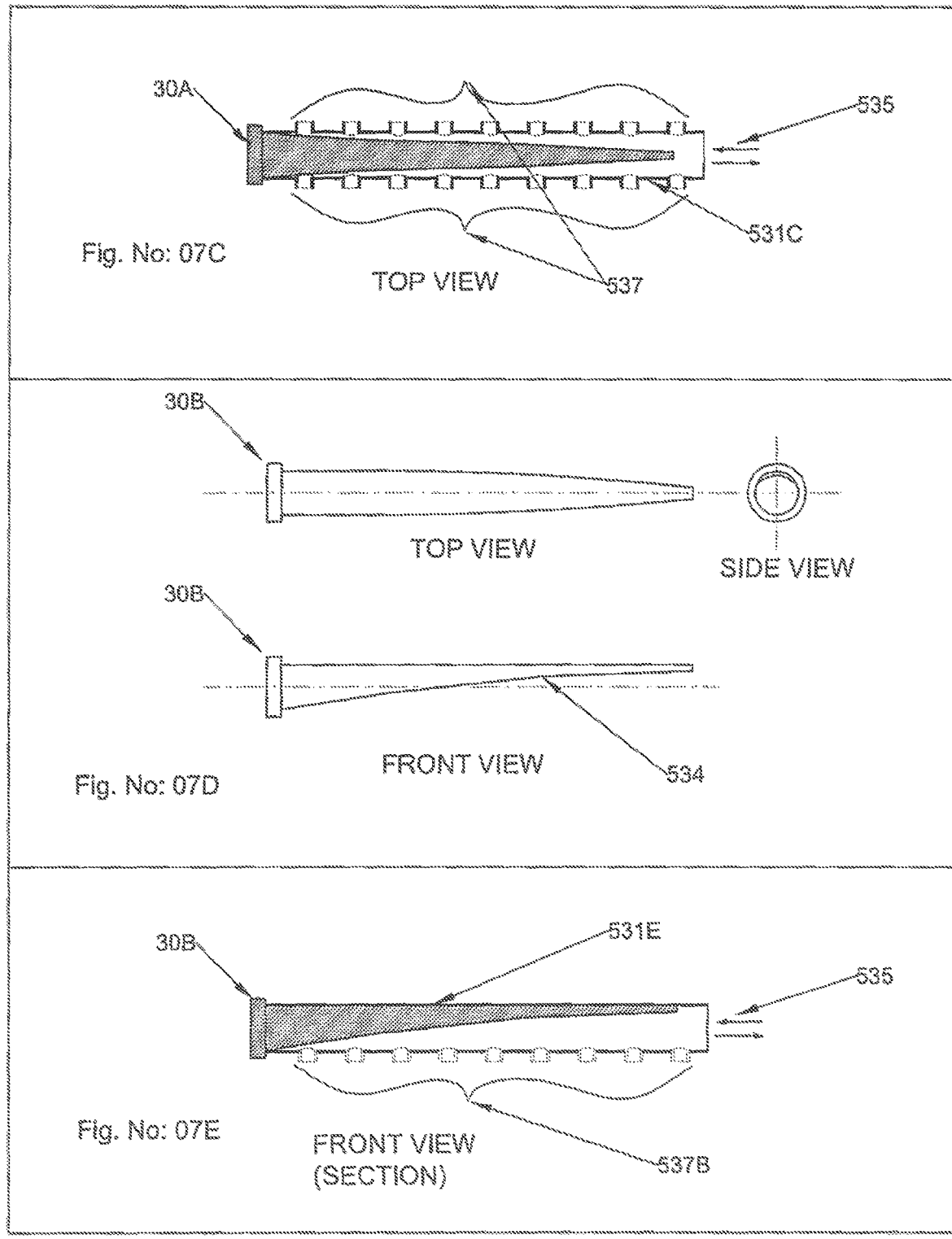

NOZZLES/SCREENS USED IN THE FLUID PROCESSING UNITS

FIELD OF THE INVENTION

Present invention relates to improvement in the different designs of nozzles/screens used in fluid processing units for fluid distribution/collection. More particularly, present invention relates to improvement of current wedge wire screens & developing its equivalent in plastics, for flow distribution & collection systems in different process applications, such as: ion-exchange units, adsorption columns, media filters & candle filters to improve its overall working efficiency & minimizing manufacturing cost.

BACKGROUND OF THE INVENTION (PRIOR ART)

There are variety of the nozzles developed, depending upon the applications, but we will consider the various nozzles/strainers used for fluid processing units only. In the processing units such as media filters, adsorption columns & ion exchange units, various types of nozzles had been developed (as referred in the citations) for the internals. The general construction details are that these nozzles are having cylindrical, semi-circular, conical-tapered closed shapes & using their first, outermost body as a boundary having apertures for fluid transport. These apertures are either vertical slots, cross-mesh or horizontal slots. The second boundary inside using apertures of circular shape or slots or mesh. The fluid transport takes place through single or multiple boundaries through a conduit or pipe in which area of cross sections are successively reduced to increase velocity of the fluid.

The prior art nozzles using mesh type aperture openings, as their first boundary are the worst type of nozzles due to clogging problems & had been already addressed by number of developers.

The prior art nozzles using horizontal slots formed by wedge-wires had been proved the most effective, as they have highest fluid transport area & non-clogging properties. These wedge-wire-screen nozzles are made of metals only; such as SS304, SS316, SS316L & Nikel alloys (Such as Hastelloy). The prices of such nozzles screens are very high compared to many nozzles made from thermoplastics, while considering corrosion resistance properties. Due to high fluid transport ability, these nozzle screens deliver/collect different quantities of fluid in a unit time due to variable fluid transporting distances from the central distribution/collection point. This drawback remains in almost all other types of screen nozzles also.

Almost all circular/cylindrical wedge-wire-screens are using closely pitched wedge wires as their primary filtering surface & secondary fluid transporting & controlling apertures on inside conduit or conical shaped, closed capsulated metallic container. The container with apertures is connected to inlet/outlet nozzle pipe. The ratio of net aperture area of primary wedge-wire screen & area of the apertures on secondary container inside decides the fluid transport parameters. In this case, the aperture changes, due to wear, results uneven fluid transport.

Fluid collection/distribution through wider angle (nearly 360°) is the classic feature of this cylindrical profile arrangement of the wedge wire screen nozzles, but fluid collection/distribution through multiple apertures inside induces uneven fluid profile outside.

The prior art wedge wire screens are required to be replaced completely when the aperture sizes changes beyond permissible limits due to wear.

The individual nozzle position w.r.t. delivery/collection point is not considered in the "variable flow screen nozzles" presented in the citation (U.S. Pat. No. 5,658,459 & US 20120037730). When using such nozzles on the header-lateral type of bottom collector, they bound to deliver different quantities of fluid in the counter-flow & co-flow. Similarly, when using such nozzles on the collection plate at the bottom of the processing vessel, for example, an ion-exchange unit, the counter-current regeneration chemical injection has dilution effect due to dead volume of water present in the bottom of the vessel, below collection plate. In case of the ion-exchangers using higher diameter of pressure vessels, the bottom dead volume of water has significant dilution effect on the injection chemical intended for counter-current flow & therefore certain higher amount of chemical dosing is inevitable even after having excellent "distribution screen nozzle".

OBJECTIVES OF THE INVENTION

The primary objective of the invention is to develop substitute nozzles system for wedge-wire screens (MOC—Metals) having high flow rate per unit surface area & non-cogging features, using suitable thermoplastics having very high corrosion resistant properties & minimum wear rate against fluid flows for higher working life span.

Another objective is to develop stack ring of the nozzles enclosure with optimum thickness & width with suitable supporting features to retain stability at different pressure conditions.

Yet another objective of the stack ring development is to achieve highest degree of fluid transporting angle through its peripheral way (nearly 360 deg.). Yet another objective of the invention is to develop variable flow nozzle with easy construction features. For example, easy assembly & maintenance of the diffuser/strainer stack of the nozzles.

Another objective of the nozzle development is to achieve equal flow distribution/collection through their connecting laterals & headers also, of the system.

Another objective of the innovation is to achieve flow control of the wedge-wire screen as per locations to achieve uniform flow velocities, which is required in number of process column operations.

Yet another objective of the nozzle development is to achieve better process efficiencies of the working columns, where the said nozzles are components of the distribution & collection network.

STATEMENT OF INVENTION

Accordingly invention provides an improvement in the conventional nozzles/screen for fluid flow distribution/collection used in fluid flow processing units comprises wedge wire screen (02) of wedge wire profiles (208) wound cylindrically, with pitch 206a to form a screen (210a) & welded with vertical rods (207) to form an open cylinder from its either side; characterised in that a pair of threaded couplings (228, 229) having external diameter nearly equal to the cylinder of the screen 210a is welded from either of its openings; one of the said coupling (229) height is kept minimum, just to introduce a flow restrictor 30 and the said other end coupling (228) is standard to receive piping connection (34); a flow restrictor 30 is made of plastic (e.g. PP, PVDF; UHMWPE) having basic cylindrical shape, having threaded end (229a) matching with the said short coupling end (429) for introducing inside the screen cylinder (210a); the said fluid restrictor (30), given taper (231) nearly up to half-way mark of the screen (210a) height, and thereafter turned into cylindrical shape (232) with conical tip (233) such that the said cylindrical shape (232) of the flow restrictor (30) passing through end coupling (228) makes washer shape orifice (235) with internal face of the pipe connection (34).

According to one embodiment the invention provides an improved nozzles/screen for fluid flow distribution/collection used in fluid processing units comprises a cylindrical outer casing of screen made of number of stacked rings, having taper towards centreonane side and flat other side or tapered both sides or flat both sides, having defined width and thickness with radially extending number of lugs formed therein with thickness slightly more than that of said ring to give desired gap between the said stacked rings; a central conduit with threaded ends located at the centre of said outer casing with the help of the said lugs having equal lengths just touching periphery of the said conduit & at least one of the lug having extended length; the said one of the lug is having extended length to engage a slot in the said conduit; the said conduit provided with number of holes at distant in line in each of channel formed by said adjacent lugs; the said outer casing held by check nut or threaded ring in the said conduit; the said conduit is provided with a flow restrictor (30C), having tapered, conical shape such that the highest cylindrical end can enclose the conduit from inside from one end; the said flow restrictor (30C) inserted from the opposite end to that of fluid distribution/collection end so that enclosing it from opposite end & the tapered end pointing towards the fluid distribution/collection end.

According to the second embodiment the invention provides an improved distribution/collection through plurality of improved nozzles connected to number of laterals (pipes) or the laterals themselves formed of perforated pipes (532); the laterals connected to another header (pipe) intended for fluid collection/distribution; the header-lateral assembly remain on one single plane; the laterals & the header pipes are applied with flow restrictors (30/30A/30B); the said flow restrictor having basic cylindrical (bar) shape closing the respective dead end of the pipes from inside (533) & cantilevered; the said flow restrictors (30/30A/30B) of the lateral or header has given taper towards distribution/collection end; the said taper of the flow restrictor (30A) may have two sided chamfer (534) or in another case the flow restrictor (30B) may have one sided chamfer, depending on sub branching (537/537B) of the header.

BRIEF DESCRIPTION OF THE DRAWINGS

FIG. 1 (Prior Art) shows the vertical & horizontal (SECTION-I) cross section of a 'wedge wire screen' nozzle & its construction details.

FIG. 2A shows a vertical cross section of "improved wedge wire screen" & its details.

FIG. 2E shows a vertical section of the "flew restrictor" (30) & its details.

FIG. 2C shows a vertical section of the "improved wedge wire screen assembly" NOZZLE-A & its sectional view (SECTION-II).

FIG. 2D shows 3D view of the "Row restrictor" (30) & its details.

FIG. 2E shows 3D view of the "improved wedge wire screen assembly" & its details.

FIG. 3A shows TOP & BOTTOM view of the "Stack Ring Type-I" & its features.

FIGS. 3B & 3C shows the SECTION-III of the stack ring type-I & its' details after stacking.

FIG. 4A shows TOP & BOTTOM view of the "Stack Ring Type-II" & its features.

FIGS. 4B & 4C shows the SECTION-IV of the stack ring type-II & its' details after stacking.

FIG. 5A shows NOZZLE-B assembly details using stack rings of Type-I or Type-II.

FIG. 5B shows vertical cross section of the NOZZLE-B without stack rings & their details.

FIG. 5C shows vertical cross section of the NOZZLE-B with "flow restrictor" loading but without stack rings loading.

FIG. 6A shows details of the SECTION-V, in which stack ring interlocking with nozzle conduit is elaborated.

FIG. 6B snows 'Blank Ring' used for supporting & partitioning the main stack-rings assembly.

FIG. 7A shows cross-section of a pressure vessel having 'Header-Lateral'type distribution/collection system with main header applied with "flow restrictor" applications branches with improved nozzles.

FIG. 7B shows 'Front View & Top View' of a cylindrical (Bar shaped) shaped "flow restrictor" with two-side chamfers.

FIG. 7C shows horizontal cross section of a header (Tap View), having laterals connections on its either sides & containing flow restrictor with either two-sided chamfer (taper) or conical shape.

FIG. 7D shows 'Front View & Top View' of a cylindrical (Bar shaped) shaped "flow restrictor" with one-side chamfer.

FIG. 7E shows horizontal cross section of a header (Front View), having laterals connections on its bottom & containing flow restrictor with one-sided chamfer (taper).

DETAILED DESCRIPTION OF THE PREFERRED EMBODIMENTS

Prior to giving details of the preferred embodiments, we would like to brief out the development for easy understanding for the present disclosure given below.

"Flow distribution nozzle systems" consists' of a set of nozzles used for fluid processing units for fluid distribution/collection applications under varied physical parameters. In the present disclosure, an attempt made to explain development work related to:
 1) Improved wedge wire screens for accurate flow control.
 2) Plastic nozzles substitute to wedge wire screen nozzles.
 3) Improved "Header-Lateral" distribution & collection by applying flow restrictors.

The following description of the parts S body components, represented by numeral annotations, elaborates prior art & the development work:

FIG. No 01 (Prior Art) represents a typical wedge wire screen 01, for which a plastic nozzle/screen substitute development, is intended. Wedge wire 06 of nearly triangular shape is wound in cylindrical shape by giving pitch (gap) 06a for fluid transport 10. Pitch between two successive wires is given to separate smallest media particles from the interior cavity of the screen & it also defines the single minimum aperture area developed at its circumference for fluid transport.

The total wedge wire screen cylinder 10a defines the total available area of fluid transport at its peripheral surface. From inside of the wedge wires screen cylinder, vertical rods 07 are welded at equidistance for physical stability. The vertical rods 07 are also welded to the top circular cap 18a, which closes the screen from one end. The bottom circular cap 18b having central inlet/outlet port 11 closes the bottom of the screen cylinder. A cylindrical cup shaped fluid restrictor 08a, having lesser diameter than screen, having apertures 09 uniformly spread over its' cylindrical surface, is welded inside the bottom closing cap 18b at the centre, at its' open end. The total aperture area of the fluid restrictor 08a formed by apertures 09 is less than the total aperture area of the wedge wire screen at its periphery. An orifice ring 09a having circular opening of diameter d0, is fixed at the entry of the nozzle port 11. The area of the orifice ring 09a (d0) is less than the total area of the openings 09 on the fluid restrictor 08a.

Thus, the first boundary of fluid transport is defined by wedge wire screen peripheral openings, the second by the total openings on fluid restrictor 08a & the third by orifice opening 09a (d0). The ratio of the net areas of the successive boundaries influences the fluid transport or Nozzle/Diffuser action. Therefore, the change of apertures due to wear of the metals results uneven flow parameters.

The improvement in the conventional wedge-wire-screens is achieved by introducing a flow restrictor (30) in the nozzles, its connecting laterals (532) & main header (531). The application of flow restrictor (30, 30A, 30B) achieves uniform distribution/collection in the processing vessel.

FIGS. 2A, 2B & 2C elaborates the improvement in the conventional wedge wire screen nozzle with few alterations (NOZZLE-A). The same NOZZLE-A is shown with 3d perspectives in the FIGS. 2D & 2E. These alterations create immaculate fluid collection/distribution profile from its peripheral openings, which is required in accurate collection/distribution of fluids in the processes.

FIGS. 2A & 2E shows modified wedge wire screen 02. Wedge wire profiles 206 wound cylindrically, with pitch 208a to form a screen 210a & welded with vertical rods 207 to form an open cylinder from its either side. Threaded couplings 22B, 229 having external diameter nearly equal to the cylinder of the screen 210a is welded from either of its openings. At one end the coupling 229 height is kept minimum, just to introduce a flow restrictor 30. The other end coupling 228 is standard to receive piping connection 34. Flow restrictor 30 is made of plastic (e.g. PP, PVDF, UHMWPE) having basic cylindrical shape, having threaded end 229a matching for the short coupling end 229 for introducing inside the screen cylinder 210a. The fluid restrictor 30, has given taper nearly up to half-way mark of the screen 210a height then it is turned into cylindrical shape 232 & finally conical tip 233. Cylindrical shape 232 of the flow restrictor 30 passing through end coupling 228 makes washer shape orifice 235 with internal face of the pipe connection 34. By manipulating the diameter of the cylindrical shape 232 of the restrictor 30, at the crossing with pipe connection 34, the flow can be controlled.

The development of the equivalent of wedge wire in thermoplastics involves in creating a circular ring which can be stacked on a conduit to receive/deliver fluid & for which the said ring must have following features:

(1) Nearly triangular shape at its cross section
(2) Thin (minimum thickness)
(3) Optimum width to offer minimum resistance to flow
(4) Supporting features on stacking
(5) Maximum fluid transporting angle (nearly 360°)

FIGS. 3A, 3B & 3C shows the features of stack ring of Type-1. The stack rings are moulded from thermoplastics such as 'PVDF, HDPE, Polypropylene' etc. depending on the physical properties & chemical resistance required These slack rings are stack-mounted on a conduit having apertures for fluid transport to form different types of nozzles or long lateral connecting to header pipe directly.

Stack ring of Type-1 is having width 'w' and thickness 't−0.25 mm' where the aperture opening between two successive rings is 0.25 mm intended. The top side of the ring surface is having taper 13a, while the opposite surface (bottom) is flat 13b. To create peripheral aperture openings in successive rings, after stacking & to support them centrally, the rings are provided with lugs 14 of flat shape having thickness 't'. The lugs 14 are the part of the ring (single mould) having tapered shape towards periphery & protruding towards the centre of the stack ring just like spoke of a wheel & touching the central conduit 16 assigned for fluid transport. The surface of the lugs 14, just touching the central conduit 16 nearly follows the curvature 19 of the conduit. The flat bottom surface of the stack ring aligns with the flat surface of the lugs 14 (SECTION-III). The top tapered ring surface creates offset of thin gap (0.25 mm) where the lugs intersects the ring. When the rings are stacked centrally on a conduit 16, by keeping lugs aligned, they create uniform aperture 17, between two successive rings as shown in the FIG. 3C & a vertical isolated port 15 between two adjacent lugs. A thin fluid path 17a is shown in the FIG. 3A.

To retain stack ring alignment on mounting central conduit, at least one lug is provided with rectangular extension 14a to form a 'male' interlock with the vertical slot of the conduit.

FIGS. 4A, 4B & 4C shows the features of stack ring of Type-2. The stack rings are moulded from thermoplastics such as 'PVDF, HDPE, Polypropylene' etc. These stack rings have similar features just like stack ring of Type-1 with minor differences.

The top side & the bottom side of the ring surfaces 113a are identical & having taper on both sides as shown in SECTION-IV. The lugs 114 are the parts of the ring similar to the stack rings of Type-1, but are having offset of thin elevation on either of its side with respect to the ring (Refer FIG. 4B) For example if a 0.25 mm aperture size is intended, then the lugs 114 have 0.125 mm offset on elevation on either side. FIG. 4C represents the aperture 117 created by to successive rings.

Referring to the crews sections (SECTION-III & IV) of both types of the stack rings, the taper angle given may variable. In our case we have maintained it in between 6 to 8 degrees with respect to flat surface of the lugs 14, 114. To increase the effective life of the stack rings from wear or erosion, the ring taper can be given by leaving a thin surface straight, at the peripheral entry of the ring (e.g. 0.25 mm). The taper given to these rings is actually identical to the wedge wire screen profiles available.

Both the above given stack ring features are intended for nozzle designs for 'outside-in-flow' applications, in which the media remains outside the screens. When the nozzle design is intended for 'inside-out-flow' then the taper given to the stack rings follows exactly reverse direction with respect to the central longitudinal axis of the stacks, while the ring lugs 14 & 114 remain identical for the respective types of the rings. In another method, the ring faces (13a, 113a—top & 13b, 113b—bottom) can be kept flat (no taper) & the lugs having desired elevation to create thin aperture.

FIG. 5A shows a sample nozzles (04) (NOZZLE-B) with the stack mounting. FIG. 5B shows vertical sections of the nozzles in which without stack rings, for simplicity. Whereas FIG. 5C shows vertical cross section of the NOZZLE-B with flow restrictor (30c) applied. The taper of the flow restricted (30c) guides the incoming fluid from the nozzle (or a long lateral) outer stack-rings & apertures (120) on the central conduit of the nozzle.

All these nozzles are either machined from the rods of the plastics, such as UHMWPE, PVDF, Polypropylene, HDPE etc. Ultra-High Molecular Weight Polyethylene (UHMWPE) is our first choice, as it is having lowest wear rate & easy machinability. However, moulding options of other thermoplastics are also satisfactory with respect to costing, easiness & overall results.

Now referring to the FIGS. 5A & 5B, NOZZLE-B, 04a; the nozzle conduit 122 holds the stack assembly 125 in between two open threaded ends 111 & 111a using check nuts or threaded rings 124, 124a for locking, respectively. Apertures 120 are assigned on the conduit per compiled channels for fluid transport. The flow restrictor (30c) having conical shape can be introduced at the end such that the taper ends at the fluid inlet/outlet end. This flow restrictor achieves unique flow distribution & collection. This type of nozzles can be connected in series to form a distributor or collector lateral by using pipe connection accessories. In this case, the fluid restrictor (30c) is introduced from the last (end) nozzle-section & its tapered end reaches the inlet nozzle-section. Or the nozzle length can be extended to convert it into a long collection/distribution lateral. Due to the length extension, the fluid restrictor (30c) can be given support at the end, mechanically, instead of cantilever.

The sectional view (SECTION-V) of the NOZZLE-B, is shown in the FIG. 6A. Stack ring 313, having tugs 314 nearly touching central conduit 322 of the nozzle. The nozzle conduit 322 is having vertical rectangular slot 314c, shown in the enlarged view, which receives extended lugs 314a of the stack rings for interlock. Apertures 320, in between adjacent lugs on the conduit 322, receives fluid in the direction 321 from the ring periphery. A thin layer of fluid path 10b is shown, which reflects ability of the stack ring to receive fluid from its periphery just like wedge wire screens.

FIG. 6B shows the blank stack ring 27, used to partition or to block fluid channels of the stack ring nozzles already elaborated. In the front view, the SECTION-V shows the stack thickness, which is just like any washer.

FIG. 7A shows horizontal cross section of a cylindrical processing vessel & its "Header-Lateral" type distribution/collection system. Header (531) connecting transition header (531a). The transition header (531a) passing through the vessel body & connecting the inlet/outlet (535) piping. Header (531) having branch outlets for lateral connections (532) on its either side at equidistance. Flow restrictor (30) is introduced in the header (531) which closes its dead end & having taper towards the distribution/collection end. The laterals (532) are constructed by connecting improved nozzles/strainers (539, 540, 541 etc.) with the help of connecting piece (538). The connecting piece (538) can also be used for fixing laterals as support. The nozzles (539, 540, 541 etc.) are having successively lower conduit diameter, as starting from branch connection towards vessel wall to achieve equal hydraulics. These modifications applied are in such a way that, the nozzles distribution & collection achieve equalization effect, if the main header (531) has square/rectangular shape at its cross-section, then the flow restrictor will have square/rectangular shape with appropriate taper. In any type of header type distribution/collection system the application of flow restrictor (30) maintains the applied pressure of distribution evenly & its gives uniform collection via all branching or collection apertures.

FIG. 7B shows a FRONT VIEW, SIDE VIEW & TOP VIEW of flow restrictor (30A). The round bar having diameter equal to the pipe—internal diameter (it may be header or lateral) has given two sided chamfer (534). The Row restrictor (30A) closes the dead-end of the pipe & its taper follows towards the distribution/collection end of the pipe from inside.

FIG. 7C shows flow restrictor (30A) applied in the header (531c) having branching on its either sides (537). The taper (534) of the flow restrictor (30A) end or nearly merges before inlet/outlet end (535) of the header.

FIG. 7D shows a FRONT VIEW, SIDE VIEW & TOP VIEW of flow restrictor (30B). The round bar having diameter equal to the pipe—internal diameter (it may be header or lateral) has given one sided chamfer (534). The flow restrictor (308) closes the dead-end of the pipe & its taper follows towards the distribution/collection end of the pipe from inside.

FIG. 7E shows the application of the flow restrictor (30B) in a pipe, which could be a header or lateral (531E) having its branching (537B) at the one side (bottom). The flow restrictor (30B) closes the dead-end of the pipe & its taper follows towards the inlet/outlet end (535) of the pipe from inside.

The flow restrictor (30) can have simple conical shape taper, regardless of the pipes branching, instead of the various shapes shown in the FIGS. 7B & 7C.

The preferred embodiments, in the different types of systems considered here, are subjected to minor changes or additions or standardizations & the same shall be covered by the given claims below.

I claim:

1. An improved nozzles and screen used for fluid flow distribution and collection used in fluid processing units comprises a cylindrical outer casing (125) of screen having an opening made of number of circular stacked rings, each of them having tapered surface (13a) towards center on one side and flat other side (13b) or tapered both sides (113a, 113c), having defined width and thickness with radially extending number of lugs(14, 114) formed therein with thickness higher than thickness of said opening of the screen; and the said lugs resting on the periphery of a central conduit(122) having threaded ends located at the center of the said outer casing; and one of the lug (14a, 114a) having extended length to engage into the vertical slot of the said conduit (314c); the said conduit (122) provided with number of holes(120) at distant in straight-line in each of channel formed by adjacent lugs(14, 114); the said outer casing held by check nut or threaded ring(124, 124a) in the said conduit; and the entire said assembled nozzle and screen having threaded ends (111, 111a) for external connections.

2. The nozzle as claimed in claim 1 wherein; the said stack rings comprising at least one face top or bottom or both tapered towards its center; having horizontally flat supporting lugs radially immerging from the outer circumference of the ring towards spoke directions at equal arc lengths; and the said lugs having an additional thickness vertically to an extent of the single slot opening (17) of the defined width of the screen making offset on the tapered side or sides; and the extended face of the said lugs have concave shape, thoroughly touching to the said central conduits' convex curvature surface; and the said lugs have conical shape such that the sides tapering towards the outermost circumference of the ring emerging into a single point; and these featured stack rings, when mounted on the nozzle, the adjacent lugs form a vertical partition creating isolated fluid channels in between adjacent lugs; and the said successive rings define slot openings of the screen at their circumference horizontally due to the offset thickness of the flat lugs.

3. The nozzle and screen of claim 1, wherein the said central conduits (122) provided with at least one male-female type interlock (314*c*) with the lugs of the said stack rings assembly; and the said central conduit is applied with conical shape flow restrictor (30*c*) enclosing it from one end whereas the tapered end reaching the inlet or outlet end of the said nozzle.

\* \* \* \* \*